(12) United States Patent
Knuthson

(10) Patent No.: US 7,389,794 B2
(45) Date of Patent: Jun. 24, 2008

(54) QUICK COUPLING HAVING PRESSURE RELIEF DEVICE FOR MULTIPLE PRESSURIZED LINES

(75) Inventor: Per Knuthson, Stenstorp (SE)

(73) Assignee: TEMA Marketing AG, Zug (CH)

( * ) Notice: Subject to any disclaimer, the term of this patent is extended or adjusted under 35 U.S.C. 154(b) by 164 days.

(21) Appl. No.: 11/273,765

(22) Filed: Nov. 14, 2005

(65) Prior Publication Data

US 2006/0130910 A1 Jun. 22, 2006

(30) Foreign Application Priority Data

Nov. 15, 2004 (DE) .................. 10 2004 055 001

(51) Int. Cl.
*F16L 37/32* (2006.01)

(52) U.S. Cl. ................ 137/614.02; 137/595; 285/120.1; 285/924

(58) Field of Classification Search ............ 137/614.02, 137/614.03, 614.04, 614.05, 594, 595; 285/120.1, 285/124.1, 124, 124.3, 924
See application file for complete search history.

(56) References Cited

U.S. PATENT DOCUMENTS

| 3,710,823 | A | * | 1/1973 | Vik ............................. 137/594 |
| 5,988,697 | A | * | 11/1999 | Arosio .................... 285/124.1 |
| 6,302,147 | B1 | * | 10/2001 | Rose et al. ............. 137/614.03 |
| 6,840,276 | B2 | * | 1/2005 | Zeiber et al. ........... 137/614.03 |
| 6,860,290 | B2 | * | 3/2005 | Knuthson .................... 137/594 |

* cited by examiner

*Primary Examiner*—Kevin L Lee
(74) *Attorney, Agent, or Firm*—Kelly Lowry & Kelley, LLP

(57) ABSTRACT

In order to create a quick coupling for connecting at least two pressurised lines to a first coupling part that is connectable to a second coupling part so as to be pressure-proof, which quick coupling in a simple manner makes possible easy coupling while avoiding the mentioned disadvantages in all pressure ranges, it is provided for an externally arranged central pressure relief device (70) which is integrated in a second coupling part, or arranged on the second coupling part in an additional block (84), to be connectable to the pressurised lines (Lx) by way of pressure-relief connection lines (52A to 52D), and for the coupling parts to be able to be reversibly brought by a lever element (92) from a non-coupled position (P1) to a coupled position (P2), and to be lockable in place.

39 Claims, 13 Drawing Sheets

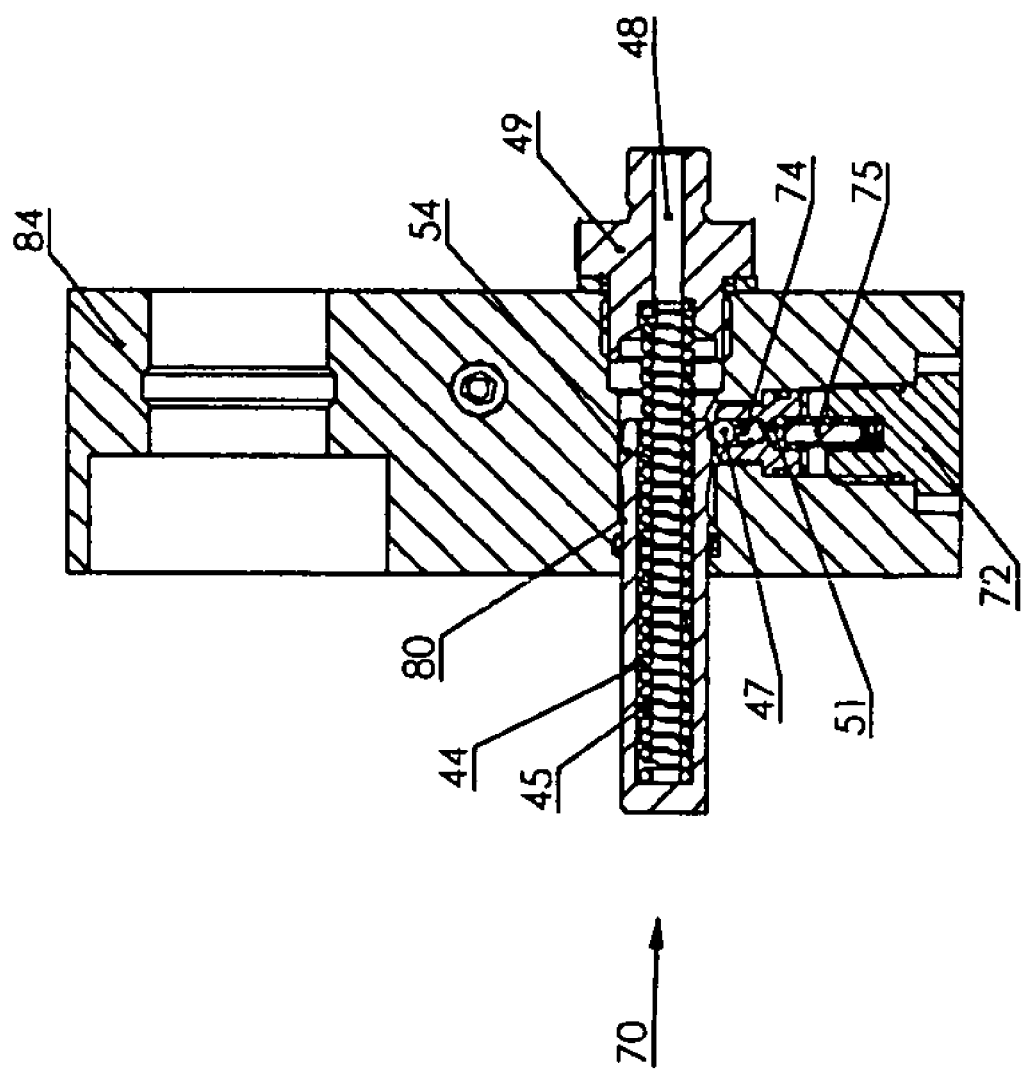

QUICK COUPLING HAVING PRESSURE RELIEF DEVICE FOR MULTIPLE PRESSURIZED LINES

BACKGROUND OF THE INVENTION

The invention relates to a quick coupling for connecting at least two pressurized lines to a first coupling part that is connectable to a second coupling part so as to be pressure-proof.

Quick couplings (rapid action couplings) of the generic type are well known. They are used to connect pressurised medium-conducting lines, and are used with liquids, for example with hydraulic oils, gases and other suitable media. Normally such quick couplings comprise two coupling parts, wherein a first coupling part is a plug-in part and a second coupling part is a socket part. To bring about coupling, the plug-in part can be pushed into the socket part. The generic quick coupling is also used to connect lines that are subjected to high media pressures. In such cases the connection has to be established one time under pressure in the socket part and another time under pressure in the plug-in part of the coupling. The connection can also be made with both coupling parts being either in the pressurised state or in the non-pressurised state.

In the case of quick couplings for high media pressures for example from 20 to 50 MPa in one of the two, or in both, coupling parts, pressure reduction elements are known for easier handling during the coupling process. By means of such pressure reduction elements it is possible to reduce the pressure in the coupling part by draining a small quantity of the medium to the face of the coupling part. Connection of the coupling parts of the quick coupling is facilitated in this way. Arranging pressure reduction elements in both coupling parts is also known.

From DE 41 01 001 A1 a coupling device is known in which a pressure reduction element is arranged and operated in the interior of at least one coupling part when the plug-in part is connected to a socket part. The pressure reduction element comprises a drain channel for the media pressure and a shut-off element which is arranged in the pressure reduction element and which can be operated by way of an operating element. When the pressure reduction element is operated the chambers of the coupling parts connected to said pressure reduction element form communicating vessels, as a result of which pressure equalisation takes place and the coupling can be closed with little physical effort.

Quick couplings are frequently associated with a problem in that the pressure reduction elements located in the coupling parts are of complex construction. Furthermore, impurities in the medium can lead to the pressure reduction elements clogging up and rendering the quick couplings heavy to operate. There is a further disadvantage in that depending on the type of the quick coupling the plug-in part or the socket part or both coupling parts have to comprise the complex pressure reduction elements.

To overcome this problem, quick couplings comprising two coupling parts, namely the plug-in part and the socket part, are known from DE 102 17 922 A1, which however comprise other pressure reduction options for the coupling process. In these quick couplings several plug-in parts of several pressurised lines are arranged in one connection block. The several socket parts which face the plug-in parts are accommodated in an additional connection block. A stud, which is centrally arranged in the connection block between the lines, is faced by a control piston between the socket parts, which control piston is centrally arranged in the connection block. The socket parts are connected to a pressure relief device. In an additional connection block (plug-in part) the elements of the pressure relief device are connected to the connection block (socket part).

Pressure-relief valve systems are integrated in the pressure relief device. Each line has its own pressure-relief valve system. The existing pressure-relief valve systems are connected to a shared pressure relief line by way of a pressure relief chamber. However, this arrangement, in which each line has its own pressure-relief valve system, is an expensive solution.

Furthermore, in most of the known quick couplings securing the coupling parts in relation to each other is problematic. Since quick couplings are also used in a very high-pressure range from 20 to 50 MPa, the requirements for firm connection between the coupling parts are very demanding. Apart from the actual design of the quick coupling, which in itself is very expensive and complicated, there is thus an additional need to integrate the locking elements in the housing of the quick coupling.

From DE 41 01 001 A1 locking elements such as clamp-type actuating springs and clamp-type ball fittings are known. These locking elements must be made to close tolerances to achieve a secure connection of the parts during the coupling action. The complex design and exacting requirements relating to the precision of the coupling part and to the additional locking parts pose considerable problems.

It is thus the object of the invention to provide a quick coupling of the generic type which in an easy way supports simple coupling while overcoming the above-mentioned disadvantages in all pressure ranges.

SUMMARY OF THE INVENTION

According to the invention this object is met by a quick coupling for connecting at least two pressurized lines to a first coupling part that is connectable to a second coupling part so as to be pressure-proof. By providing a central pressure relief device which is integrated in a second coupling part or externally arranged in an additional block on the second coupling part, wherein the pressure relief device can be connected, by way of pressure-relief connection lines, to the pressurised lines, and the coupling parts are reversibly movable from a non-coupled position to a coupled position by a lever element, and are lockable into place, a quick coupling is created for which a central pressure relief device is necessary for pressure relief during a coupling process. In an advantageous manner the lever element ensures that easy guidance in relation to each other, and safe coupling of the coupling parts in the coupled position are ensured. In the coupled position the coupling parts are safely locked into place. According to the invention, the solution provides a coupling which in an advantageous way provides a simpler design which in addition meets the safety requirements of quick couplings, in particular also in higher pressure ranges.

The first coupling part which forms the quick coupling is a plug-in part and the second coupling part is a socket part. The plug-in part is held together with a first guide pin (working ram) in a second connection block, which forms part of the plug-in part. The socket part is arranged in a first connection block.

In a preferred embodiment the quick coupling comprises a control device for the central pressure relief device. This control device is arranged in the first and second connection blocks or, in a further embodiment variant, in the first and second connection blocks, or in the first and second connection blocks and the additional block adjacent to the second coupling block. The connection blocks, or the additional block arranged adjacent to the first connection block of the second coupling part, result/results in a very compact design of the quick coupling according to the invention.

Furthermore, a preferred embodiment of the invention provides—as a control device—for a first guide pin, arranged in the plug-in part, in the coupled position to act on a control socket which is arranged in the first connection block, through which control socket a pressure-relief valve system of the central pressure relief device is operable in the first connection block, or in the first connection block and the additional block.

The central pressure relief device comprises the pressure relief valve system and an elimination valve with a pressure relief line. In addition a pressure chamber is arranged between the pressure-relief valve system and the pressure relief line of the elimination valve.

Another preferred embodiment of the invention further provides for several coupling pairs to be arranged in the quick coupling.

The characteristics according to the invention consist of several coupling pairs being designed so as to be pressure-relievable during the coupling action, by way of the pressure relief device, which is centrally arranged externally, i.e. arranged outside the plug-in part or the socket part. The central pressure relief device is connected to each of the pressurised lines, i.e. the respective coupling pair, by way of the pressure-relief connection lines.

In a further preferred embodiment of the invention each coupling pair in the pressure-relief connection lines is associated with at least one nonreturn valve by means of which valve pressure relief between the pressurised lines and the central pressure relief device is settable.

During coupling of the coupling pairs, the pressure-relief valve system that exists for all coupling pairs or for the associated pressurised lines of the central pressure relief device opens up depending on the arranged control device. The control device ensures that pressurised parts of the coupling pair are depressurised at the right point in time by way of the pressure relief device, as a result of which the medium flows into the pressure chamber and from there is evacuated into the pressure relief line of the elimination valve.

In a preferred embodiment of the invention, during the coupling process the control device makes possible synchronisation of the opening of the pressure-relief valve system with the coupling process corresponding to the control cam that is arranged on the control socket.

Thus, pressure equalisation of several coupling pairs takes place synchronously by way of the pressure-relief connection lines in the pressure relief device. The arranged nonreturn valves of the respective coupling pairs make it possible to set each pressurised line.

To achieve the shortest possible but synchronised opening of the pressure-relief valve system, the control socket is arranged such that the control cam is moved into, or out of, the pressure-relief valve system precisely at the point in time at which the respective sealing devices in the coupling parts open or close so that pressure relief takes place at a precisely predeterminable point in time.

In an advantageous embodiment an internal pressure reduction element is arranged in the interior of a coupling part.

In an advantageous way according to the invention the first and second coupling part are reversibly brought from a non-coupled position to a coupled position by a lever element, and are correspondingly locked in place in the coupled position. According to the invention to this effect the first connection block comprises a lever attachment for the lever element with its arranged lever arm. According to the invention the second connection block comprises an accommodation element which is engaged by a lever accommodation device of the lever element already in the non-coupled position. In this way, by operating the lever element the first coupling part (plug-in part) can be brought to the second coupling part (socket part) by swivelling the lever element, and in the coupled position can be secured by the lever element. In this coupling, which is supported from the outside by the lever element, the first guide pin (working ram) engages the control socket that is arranged in the first connection block, and together with the pressure relief device forms the control device for pressure relief of the quick coupling.

By means of the pressure-relief connection lines arranged in the first connection block, or in a further embodiment variant arranged in the additional block, all arranged coupling pairs are thus depressurised at the same time within the quick coupling by way of the central pressure relief device.

Below, further preferred embodiments of the invention are described with reference to a coupling pair.

The embodiments correspondingly apply to each coupling pair, i.e. also in the case of designs involving several coupling pairs within the quick coupling according to the invention.

In a preferred embodiment of the invention the pressurised lines are coupled to each other, wherein at the same time axial displacement of the first guide pin (working ram) in the second connection block of the plug-in part in the direction of the first connection block of the socket part, or of the first connection block (coupling block) and the additional block takes place. The first guide pin (working ram) slides the control socket, which is arranged in the first connection block of the socket part or of the first connection block (coupling block) and of the additional block. First, the control cam of the control socket operates a pressure relief valve and opens a pressure-relief valve system and thus the pressure relief device. Pressure relief of a first medium channel in the socket part takes place.

In the quick coupling subsequently a fourth sealing device in the socket part is released, and further pressure equalisation takes place first from the first medium channel in the socket part to a chamber in the plug-in part. The pressure in the quick coupling is then relieved up to the chamber.

Also preferred is the opening of a first sealing device of the plug-in part after opening an additional pressure reduction element, after which the coupling pair of the quick coupling start to open completely. As a result of continued engagement of the control cam on the pressure relief valve of the control sleeve that has been pushed further into the pressure-relief valve system, the pressure-relief valve system is still open so that pressure relief is continued.

Finally, the first sealing device opens completely, as a result of which by further axial displacement of the coupling parts and of the first guide pin (working ram) the control cam of the control socket is led out of the pressure-relief valve system while releasing the pressure relief valve so that the pressure-relief valve system closes and the pressure in the quick coupling builds up.

In a preferred embodiment of the invention the control socket can comprise several control cams so that opening and closing the quick coupling is possible by multiple opening and closing of the pressure-relief valve system. In this case, pressure relief in the coupling parts of the quick coupling is possible at different points in time.

Further preferred embodiments of the invention are stated in the remaining characteristics provided in the subordinate claims.

BRIEF DESCRIPTION OF THE DRAWINGS

Below, one embodiment of the invention is explained in more detail with reference to the associated drawings. The following are shown:

FIG. 2C a section of a pressure relief device in an additional block of the quick coupling in the non-coupled state;

DETAILED DESCRIPTION OF THE PREFERRED EMBODIMENTS

Figure 1:
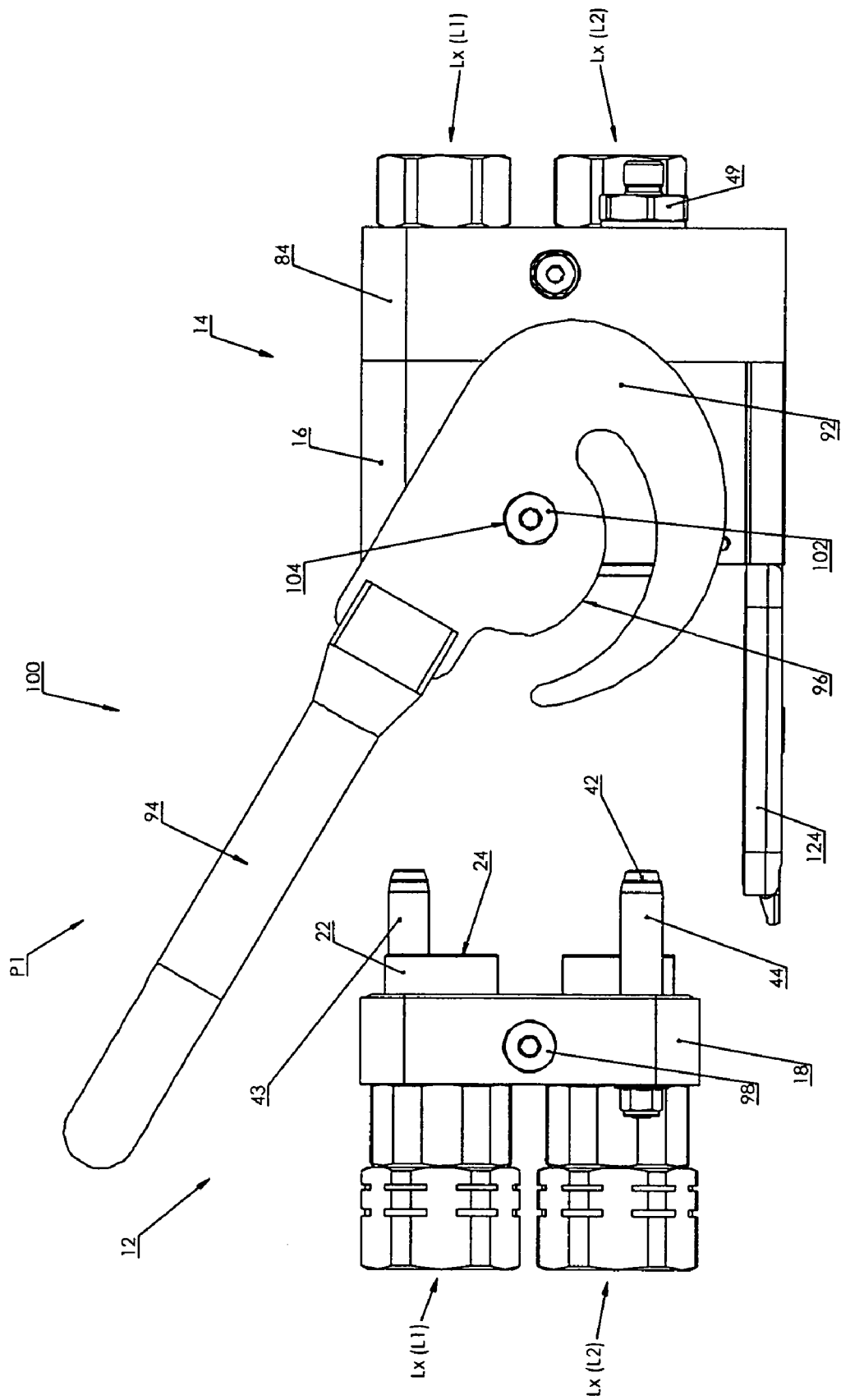
FIG. 1 an outside view of a quick coupling in the non-coupled state.

Below, reference is made to the figures, wherein in all figures identical parts are designated by identical reference characters.

The quick coupling, overall designated 100, in FIG. 1 shown in the non-coupled state P1, comprises a known basic design comprising two coupling parts 12 and 14. In this arrangement the second coupling part is a plug-in part 12 and the first coupling part 14 is a socket part 14. The special feature of the quick coupling 100 consists of several plug-in parts 12 of several pressurised lines L1, L2 (Lx), which lines are to be connected to each other, being arranged in a second connection block 18.

The several possible socket parts 14 which face several possible plug-in parts 12 are accommodated in a first connection block 16. FIG. 1 also shows the lines Lx (L1, L2) that lead out of the socket parts 14. Hereinafter a plug-in part 12 and a socket part 14 are designated a coupling pair.

FIG. 1 thus shows a quick coupling 100 with two coupling pairs that are associated with two pressurised lines L1, L2. One special feature of the embodiment shown consists of an additional block 84 being attached to the first connection block 16 (coupling block) in which, in this embodiment, there is a pressure relief device 70 (not shown in FIG. 1). The following description and the associated figures explain the arrangement of the pressure relief device 70 and of a control device 10 (not shown in FIG. 1) in the second connection block 18 (plug-in part 12) or on the first connection block 16 (coupling block/socket part 14) and an additional block 84 as an additional device that is associated with the first connection block 16 (coupling block).

However, the invention also relates to a design without an additional block 84. In this case all the components that would otherwise be arranged in the additional block 84 are arranged in the first connection block (coupling block/socket part 14).

Figure 2A:
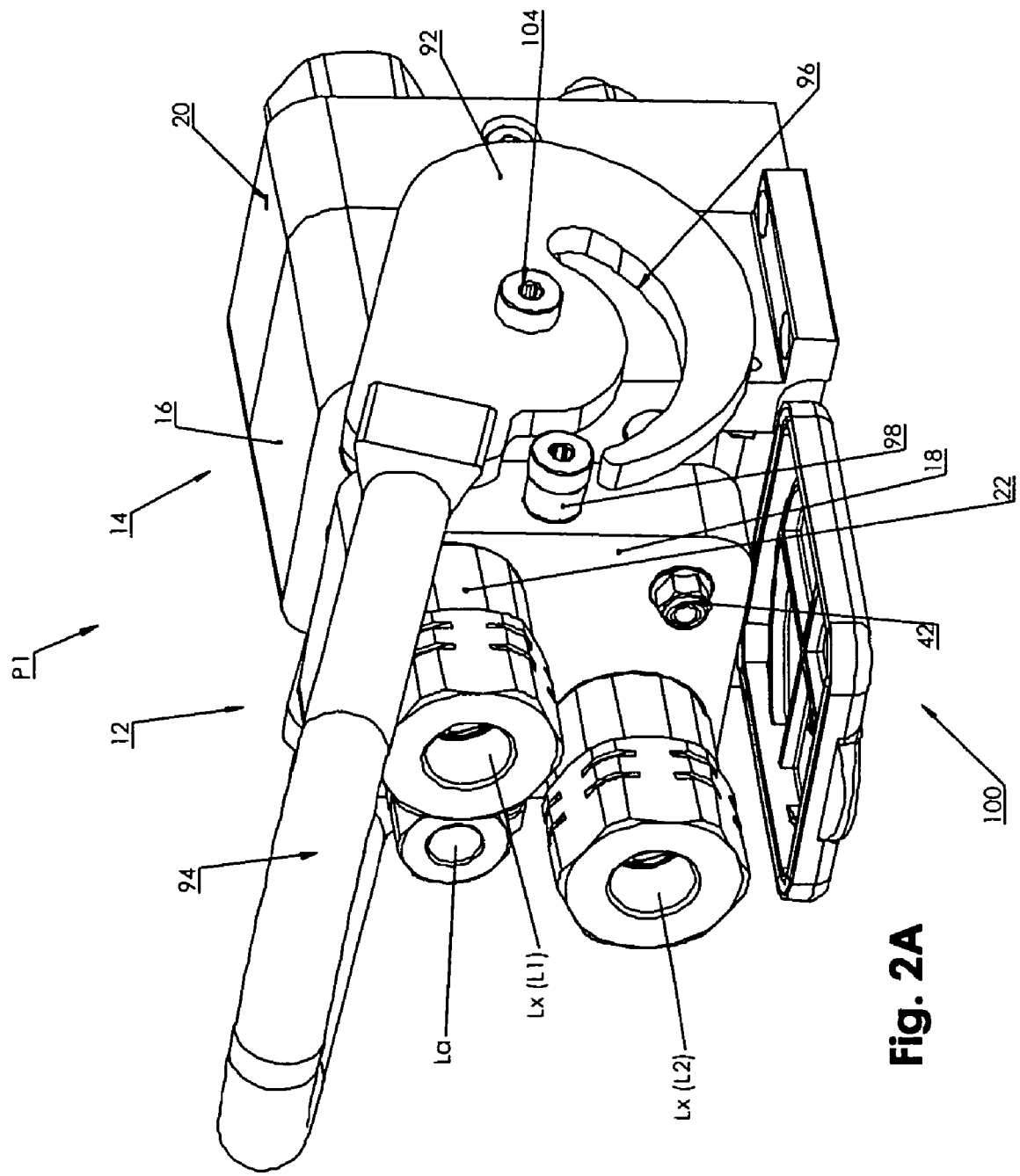
FIG. 2A a perspective view of the quick coupling in the non-coupled state.

FIG. 1 shows a first guide pin (working ram) 42, which is arranged beside the lines Lx in the second connection block 18. In the first connection block 16 the first guide pin (working ram) 42 faces a control socket 44 (FIG. 2, but not visible in FIG. 1) as part of the control device 10.

Figure 9:
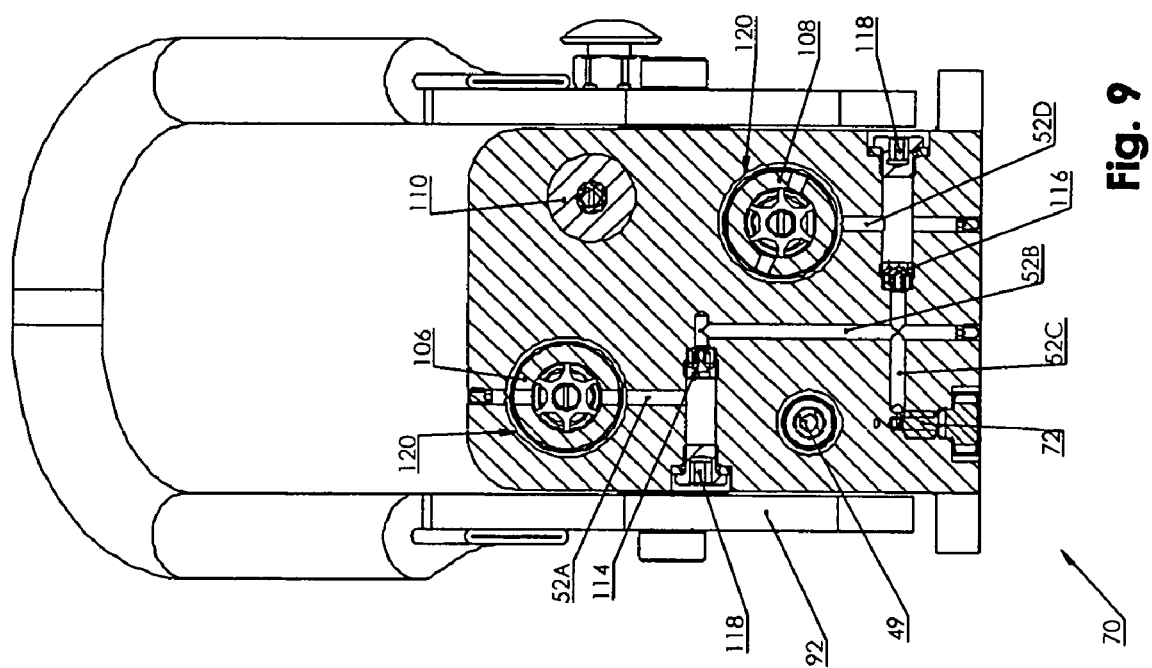
FIG. 9 a section, comprising several sectional planes, showing the pressure-relief connection lines, the nonreturn valves between the pressure lines, and the pressure relief device as well as the lever element and the machine-side connection adapters.

FIG. 1 further shows a second guide pin 43, which in the first connection block 16 faces a borehole 112 (FIG. 9). In the second connection block 18 the second guide pin 43 is arranged as a centring aid in addition to the first guide pin 42. Furthermore, FIG. 1 shows an elimination valve 49 arranged on the additional block 84 beside the pressure lines Lx. This elimination valve 49 is used for pressure relief during the coupling procedure of the quick action coupling 100. As shown in FIG. 1, according to the invention the quick coupling 100 comprises a lever element 92 which comprises a lever arm 94 and a lever accommodation device 96. By way of a lever attachment 102, the lever element 92 is rotatably held on the first connection block 16. The lever element 92 forms a rotary axis 104 of the lever. On the second connection block 18 an accommodation element 98 is arranged, which, when the lever element 92 is fully lowered and when the plug-in part 12 is plugged into the socket part 14, engages the lever accommodation device 96. As a result of the lever element 92 the plug-in part 12 can be displaced in relation to the socket part 14 and due to the control curve in the lever accommodation device 96, when the accommodation element 98 engages the lever accommodation device 96, said plug-in part 12 can be moved to the socket part 14 and is lockable into place and securable in a non-coupled position P1 (not shown). In a position P1 that is not coupled in FIG. 1, the socket part 14 can be locked by a hinge able cover 124 so that the socket part 14 is protected from dirt and the like. The following figures show the coupling process and the additional functions of the quick coupling 100.

Figure 2B:
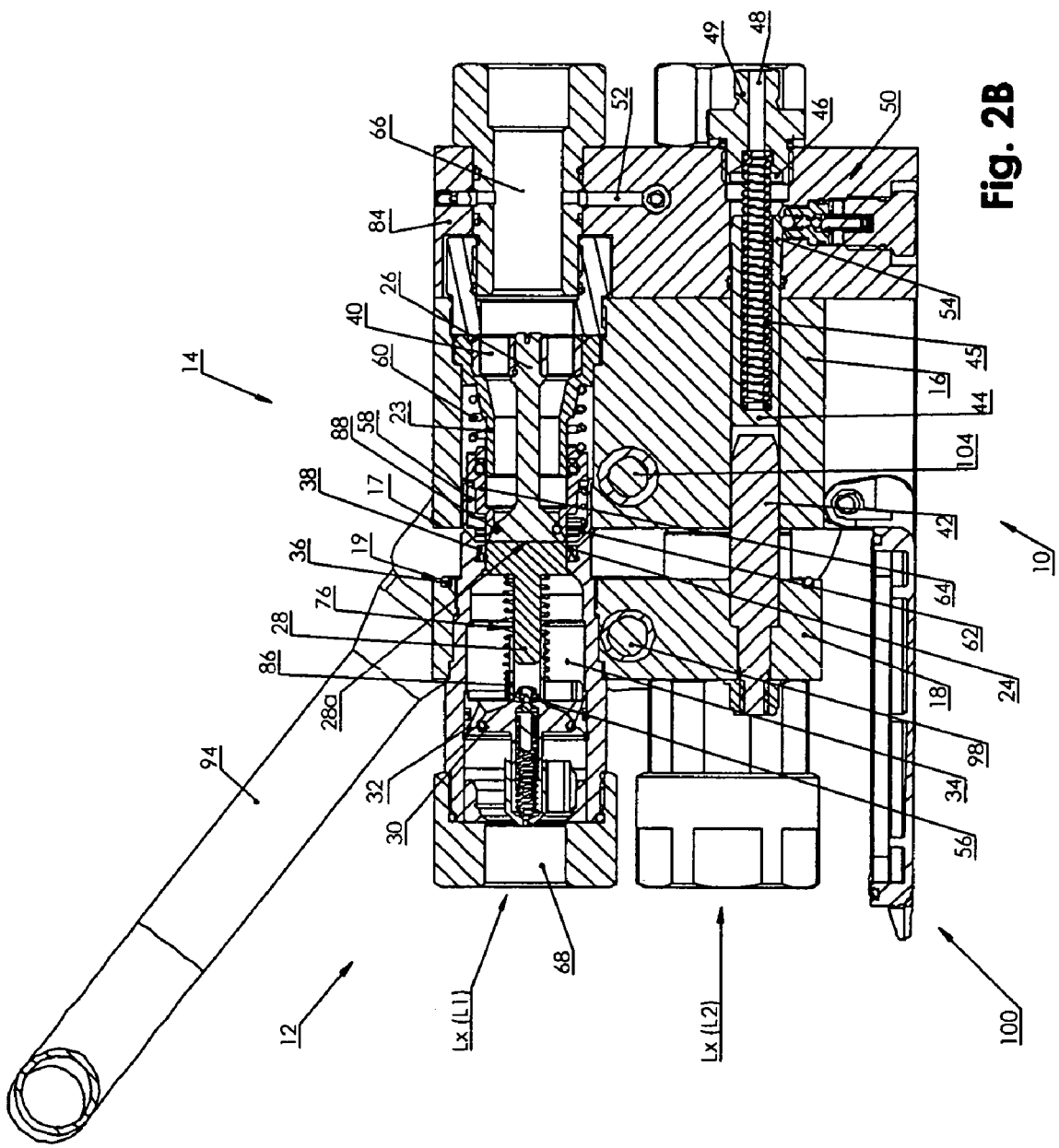
FIG. 2B a section of the quick coupling in the non-coupled state.

FIG. 2A again shows the quick coupling 100 in the non-coupled position P1, wherein the accommodation element 98 already accommodates a first contact in the lever accommodation device 96 of the lever element 92. Unlike the perspective view of FIG. 2A, which shows the same components as in the lateral view of FIG. 1, FIG. 2B shows the quick coupling 100 in a sectional view. In this arrangement FIG. 2B shows a sectional view of a coupling pair 12, 14 (plug-in part and socket part) of the pressurised pressure line L1. Also shown is the control device 10 which comprises the working ram 42, a control socket 44 and a pressure-relief valve system 50. The pressure-relief valve system 50 forms part of the central pressure relief device 70, which in addition comprises the elimination valve 49 and a pressure relief line 48. The central pressure relief device 70 is shown in detail in FIG. 2C in a further sectional view that is analogous to the view in FIGS. 2A, 2B in the non-coupled state P1 of the quick coupling 100.

In its home position the face 24 of the housing 22 of the plug-in part 12 rests against an axially displaceable second housing element 62 of the socket part 14. Furthermore, the face 24 of a ram 28, which ram 28 by way of a third sealing device 38 provides a seal on a second housing 22 of the plug-in part 12, rests against a firmly held slide element 26.

The slide element 26 is held in a slide element bearing 40. The force of a first spring element 76 pushes the ram 28 that is axially guided in a ram bearing 86 against the third sealing device 38 and closes a chamber 34 off against the atmosphere. A first sealing device 30 on a seal seat 32 closes off the chamber 34 in the direction of a second medium channel 68 that conveys medium and is pressurised.

A pressure reduction element 56 can be arranged in the sealing device 30. However, the function according to the invention of the quick coupling 100 according to the explanations below is available also without a pressure reduction element 56.

The socket part 14 is integrated in the first connection block 16. The socket part 14 seals an outer housing 20 off against the first connection block 16. The outer housing 20 of the socket part 14 comprises the inner first housing element 23, the outer third housing element 64 and the front second housing element 62.

Figure 8:
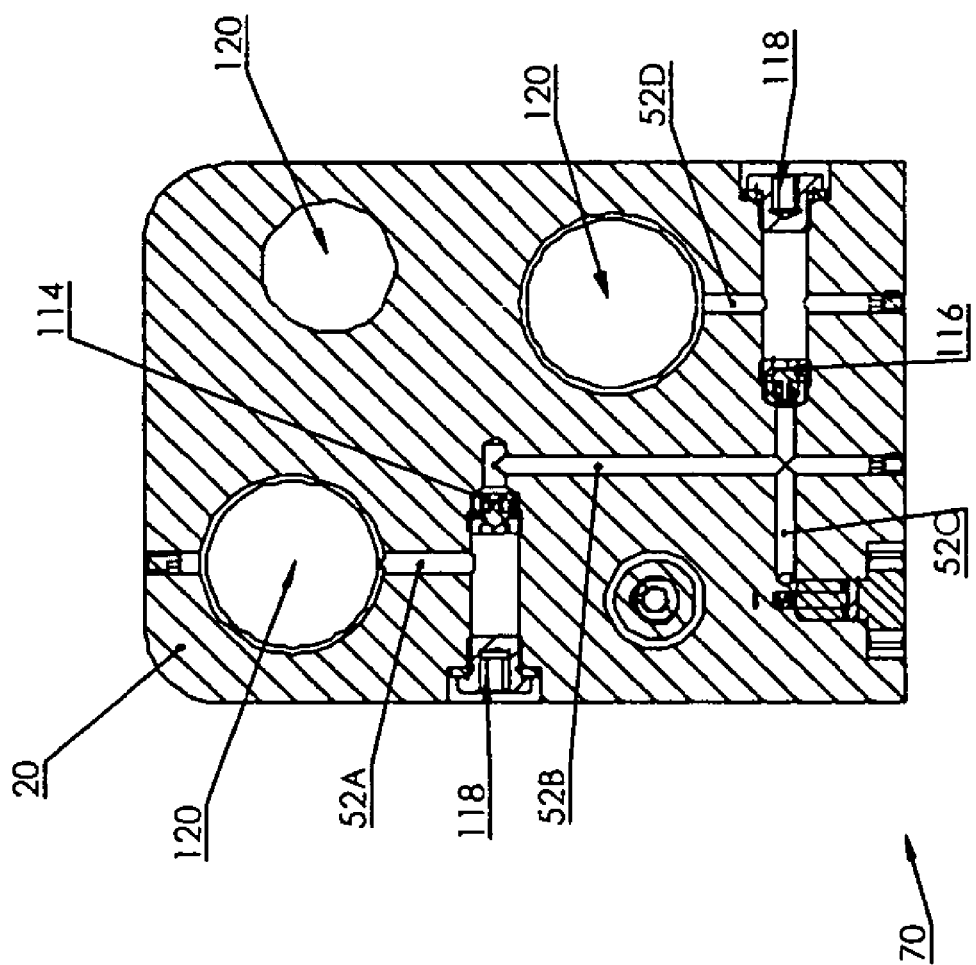
FIG. 8 a section of the additional block with a view of the pressure-relief connection lines and the nonreturn valves between the pressure lines and the pressure relief device.

The second housing element 62 is arranged on the interior wall of a borehole 120 (FIG. 8). The second housing element 62 is axially displaceable in relation to the third housing element 64 as well as in relation to the first housing element 23 against the force of a first and second spring element 58, 60. The first spring element 58 is arranged between the housing elements 62 and 64, and the second spring element 60 is arranged between the housing elements 64 and 23. By way of a fourth sealing device 88 the slide element 26 seals the socket part 14 against the axially displaceable third housing element 64 in the non-coupled state P1.

A first medium channel 66 is connected to the slide element 26, which medium channel 66 is open towards the medium-conveying first pressure line L1 of the socket part 14. In the embodiment shown the first medium channel 66 is integrated in the additional block 84. As mentioned above, where there is no additional block 84, said medium channel 66 can also be completely arranged in the first connection block 16 (coupling block).

In the first connection block 16 and the additional block 84 a control socket borehole 78 is arranged so as to be spaced apart parallel in relation to the coupling pair 12, 14. The control socket 44 is integrated in this control socket borehole 78, which control socket, as shown in FIG. 2B, is not yet engaged by the working ram 42 in the non-coupled position P1. The control socket borehole 78 guides the control socket 44 right into the additional block 84, wherein within the control socket 44 a control socket spring 45 is arranged which not only rests against the inside of the control socket 44, but is also arranged in an indentation of a pressure relief chamber 46. The control socket 44 rests on the same axis as the working ram 42, and in the non-coupled state P1 forms a limit stop 80 in the control socket borehole 78.

In the non-coupled state P1 the working ram 42, which forms part of the control device 10, and at least one control cam 54 arranged on the working ram 42 do not engage the pressure-relief valve system 50.

The pressure-relief valve system 50 which forms part of the control device 10 is a main component of the pressure relief device 70 which in FIG. 2C is shown in an enlarged view. The pressure-relief valve system 50 comprises a pressure relieve valve 72, a spring control device 74 as well as a valve element 51. In this arrangement the part 47 transfers the axial movement. Behind the pressure relief valve 72 (FIG. 2C) there is a pressure-relief connection line 52 or a system of pressure-relief connection lines 52A to 52D, byway of which the coupling pairs 12, 14 and thus the pressurised pressure lines Lx (L1, L2) are vented by way of the central pressure-relief valve system 50 of the pressure relief device 70. This requires that the pressure relief valve 72 opens at a particular point in time during the coupling procedure, thus making possible coupling of the coupling pairs without any pressure, i.e., pressure-proof.

Figure 3:
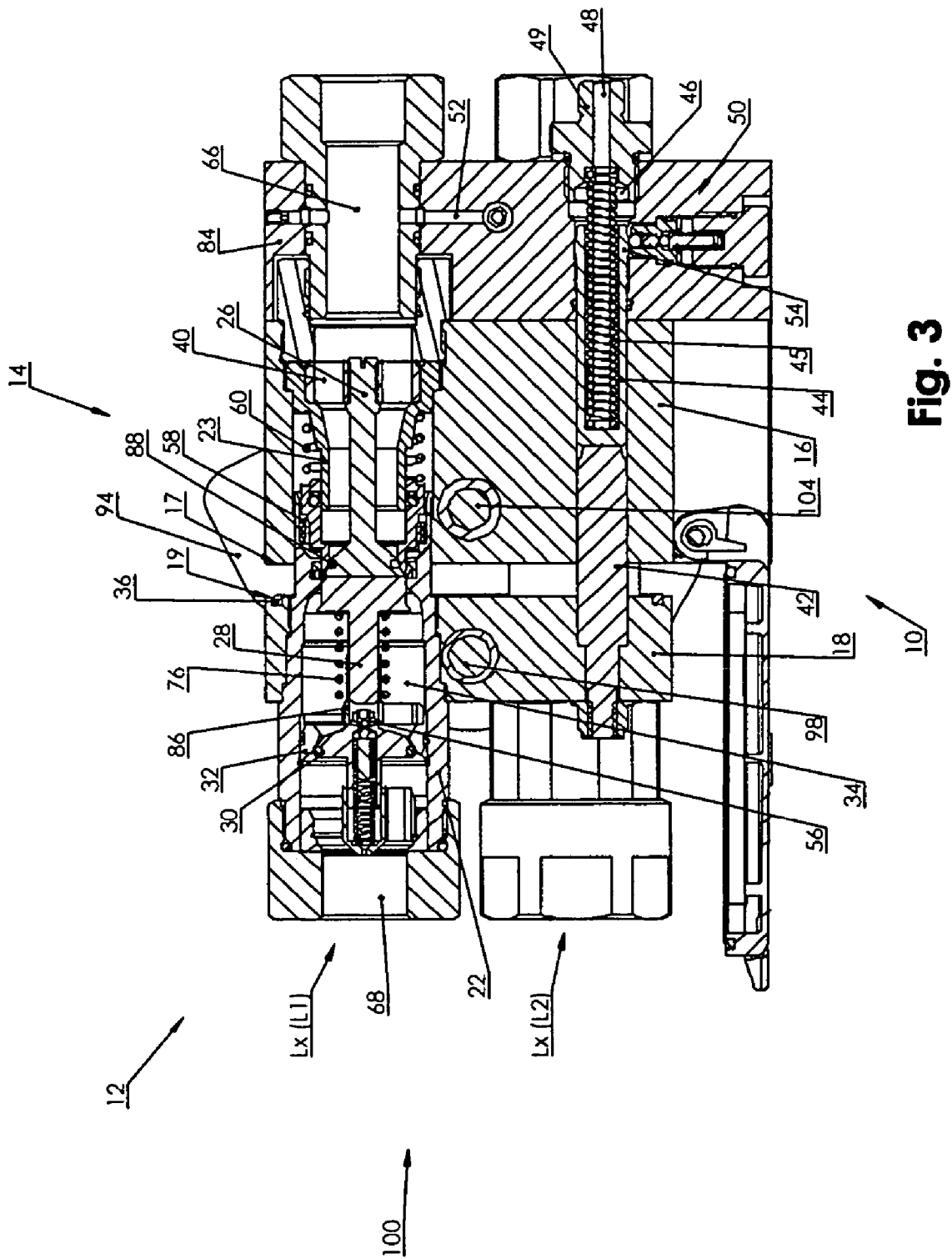
FIG. 3 a section of the quick coupling in the partly coupled state in a first coupling step.
Figure 4:
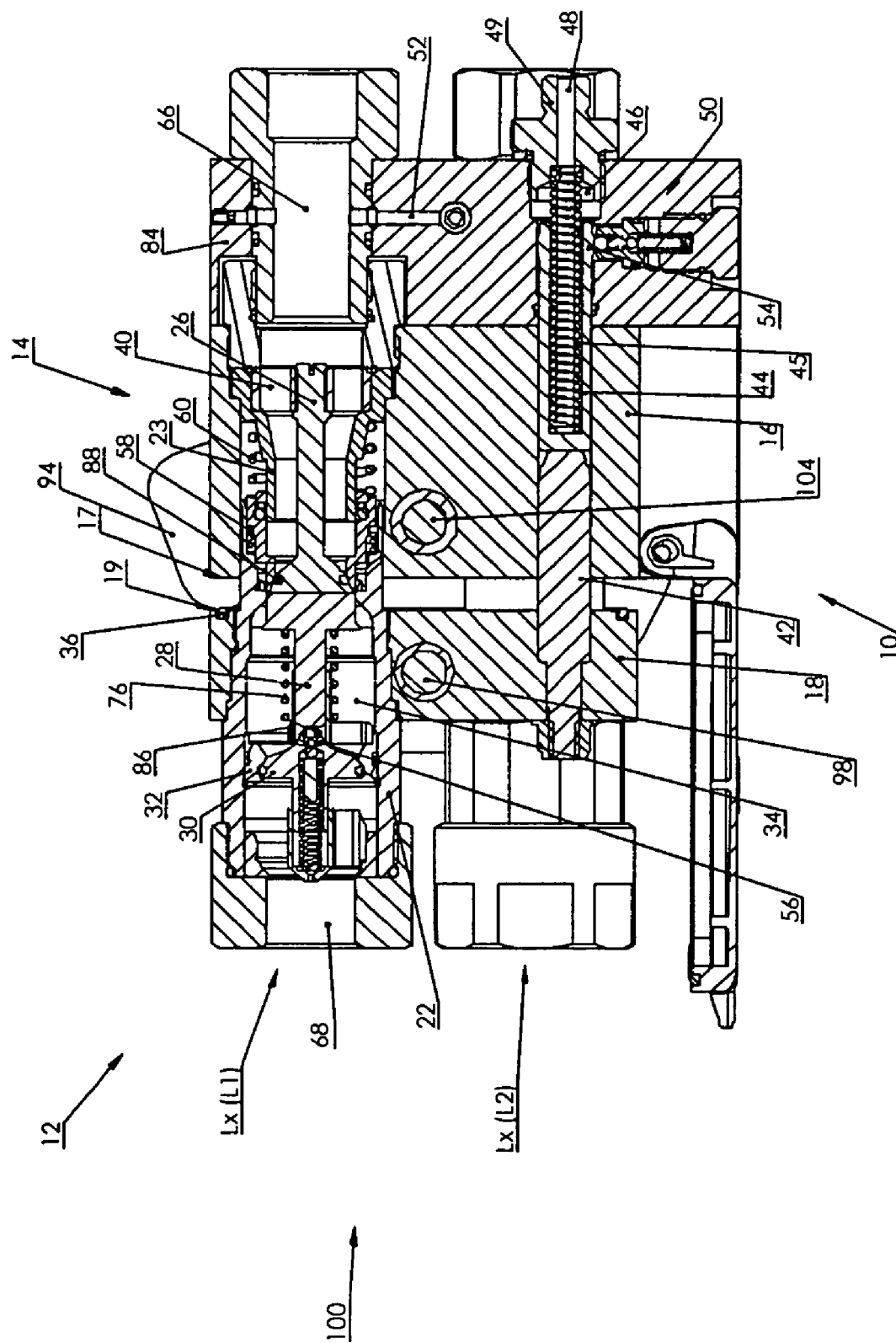
FIG. 4 a section of the quick coupling in the partly coupled state in a second coupling step.
Figure 5:
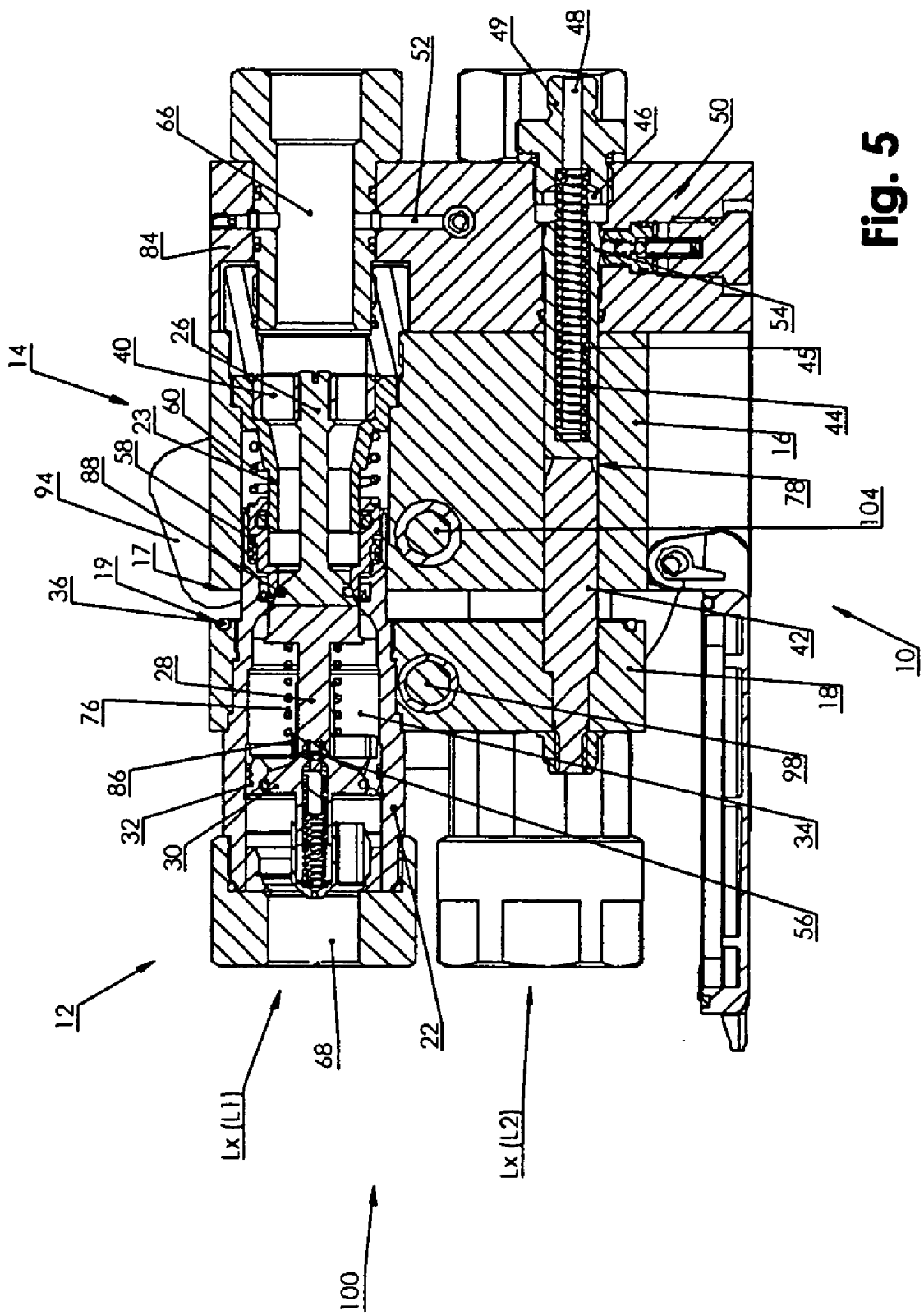
FIG. 5 a section of the quick coupling in the partly coupled state in a third coupling step.
Figure 6A:
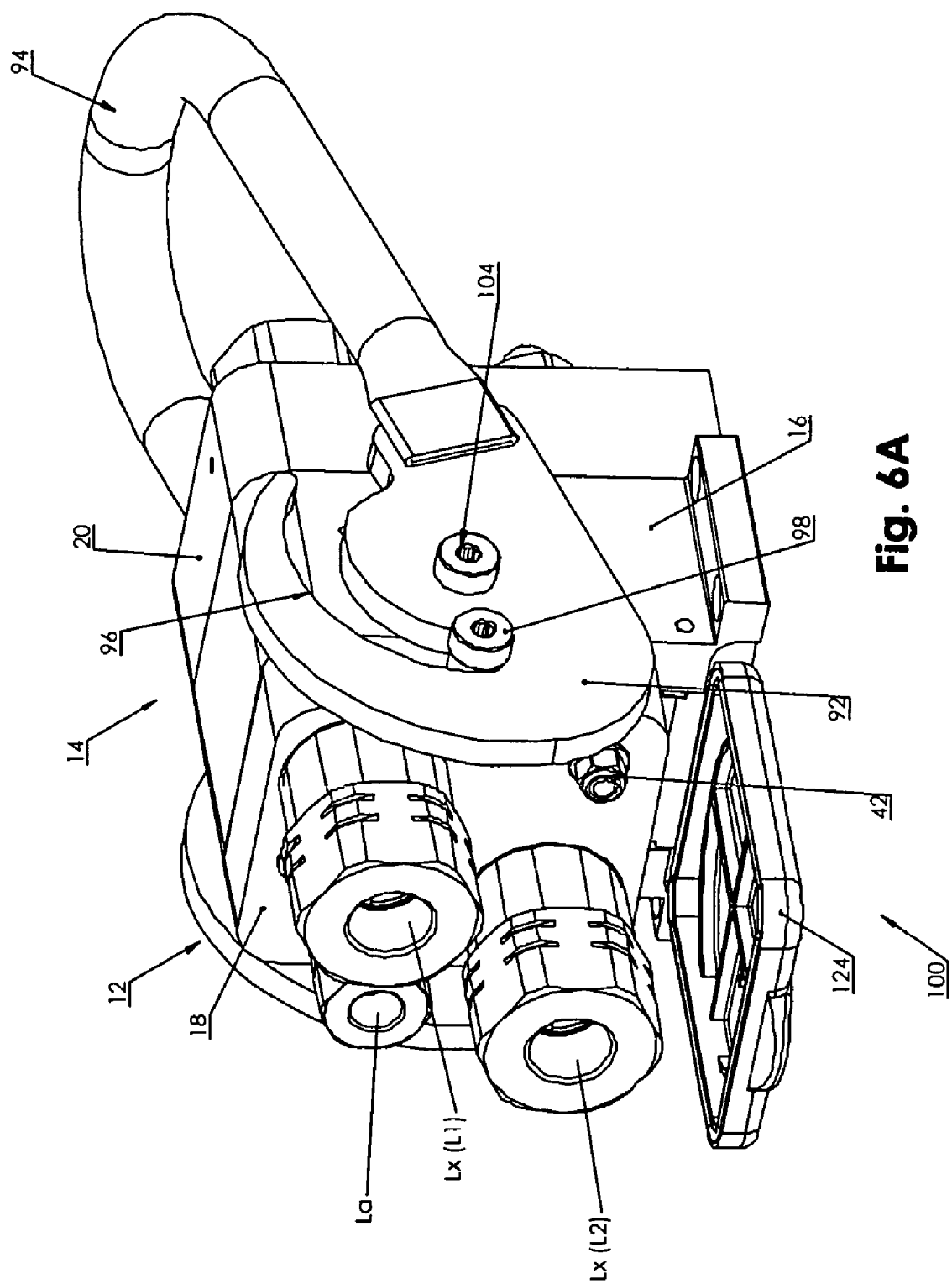
FIG. 6A a perspective outside view of the quick coupling in the coupled state.
Figure 6B:
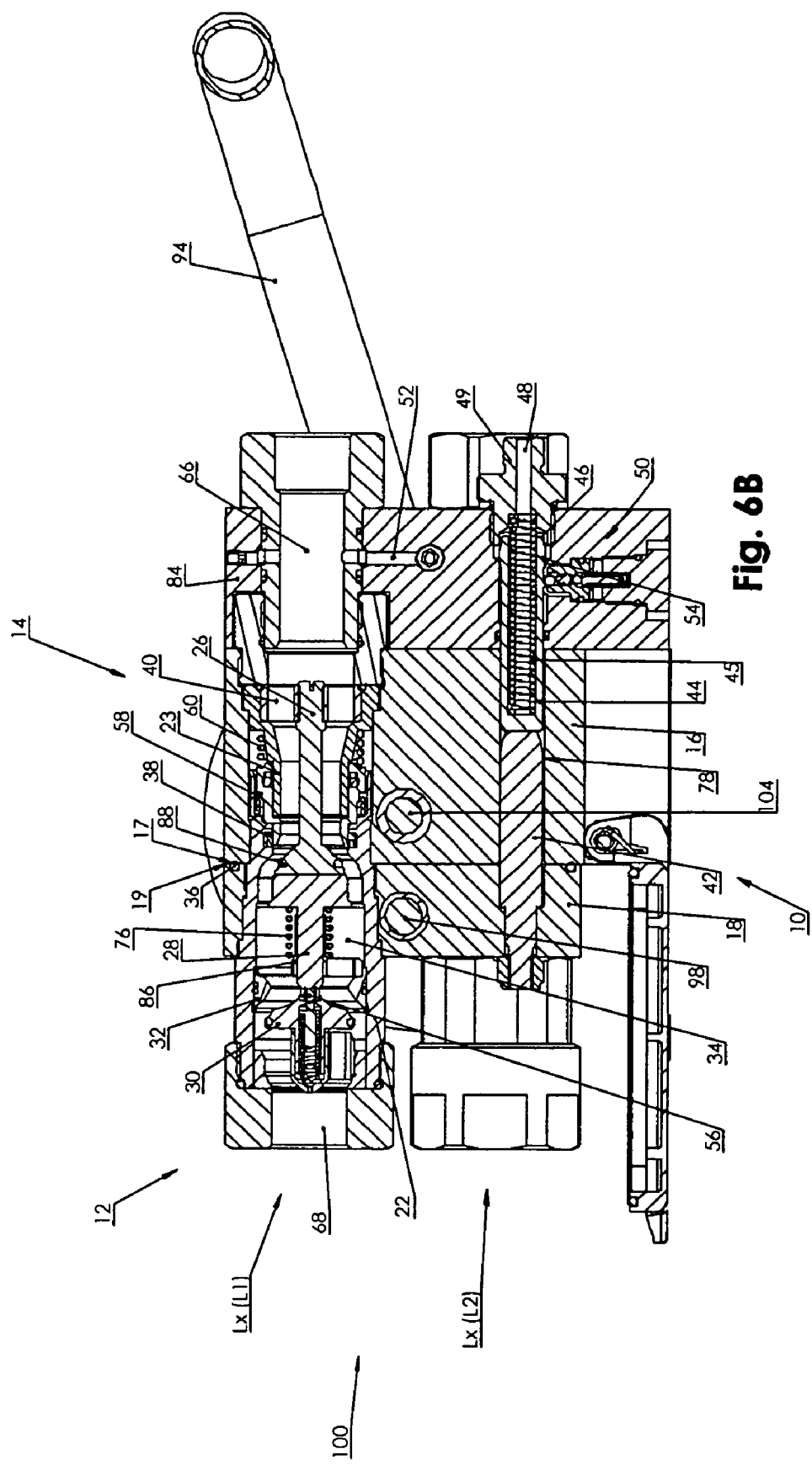
FIG. 6B a section of the quick coupling in the coupled state according to a fourth coupling step.
Figure 6C:
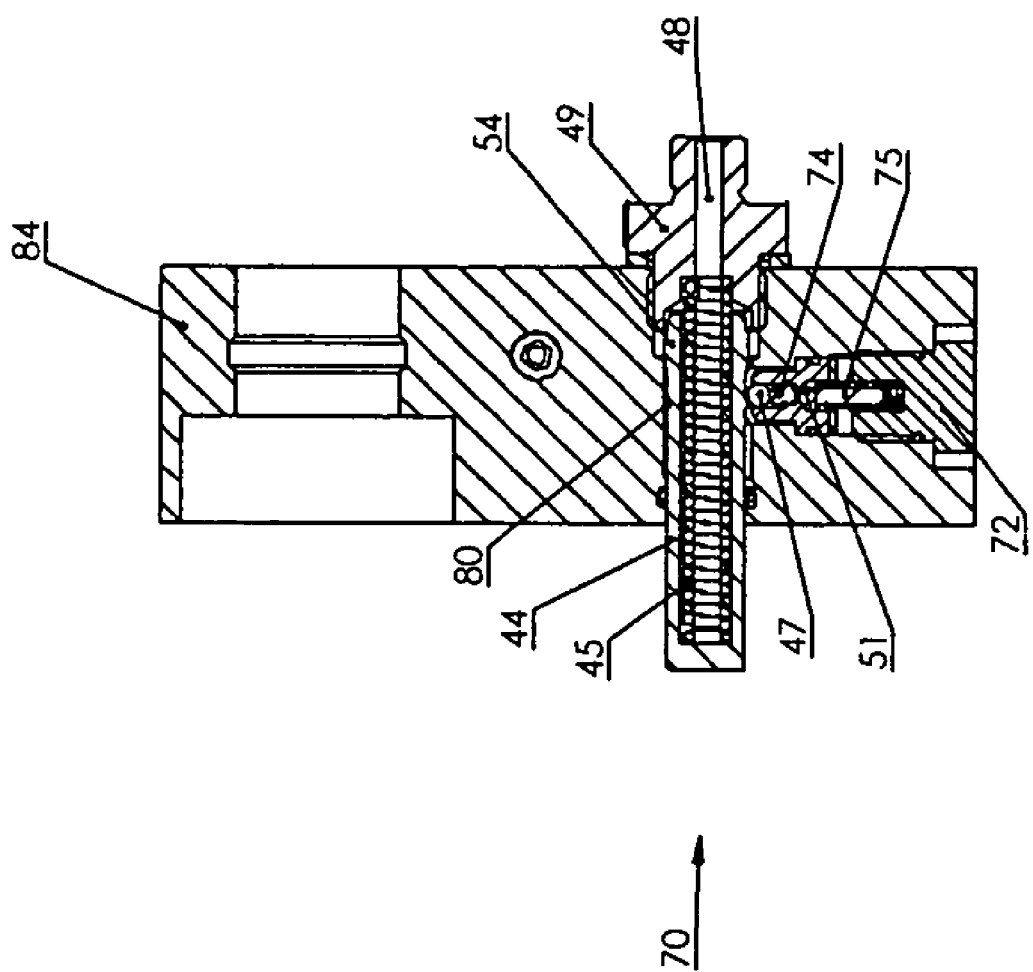
FIG. 6C a section of a pressure relief device in the additional block of the quick coupling in the coupled state.

FIGS. 3, 4 and 5 as well as 6A to 6C show the coupling procedure with which an incremental pressure relief of the quick coupling 100 in the plug-in part 12 and socket part 14 is achievable. In the following it is assumed that both coupling parts 12 and 14 in the medium-carrying channels 66, 68 are pressurised in the non-coupled state P1. FIGS. 6A to 6C show the completely coupled state P2, wherein again a perspective outside view, a section of the quick coupling 100 and a section of a pressure relief device 70, shown in an enlarged view, of the quick coupling 100 are shown.

In principle, coupling takes place in four steps. In the first coupling step pressure relief of the first medium channel 66 takes place after opening the elimination valve 49. Subsequently, in the second coupling step, opening of the fourth sealing device 88 and elimination of the pressure up to chamber 23 take place. In the third coupling step again, opening of a device, namely of the pressure reduction valve 56, takes place, as a result of which, elimination of the pressure in the second medium channel 68 occurs, after which finally in the fourth coupling step complete opening of the plug-in part 12 takes place by lifting the first sealing device 30. There is thus a constant sequence of the procedures of "opening-elimination-opening-elimination . . . " and so forth.

Below, the function of further pressure relief is described in more detail.

FIG. 3 shows a section of the quick coupling 100 in the first coupling step. In this first coupling step, at first the elimination valve 49 is opened to relieve the pressure of the coupling parts 12, 14.

The non-coupled quick coupling 100 of FIG. 2 represents the starting position for opening the elimination valve 49. By axial displacement of the second connection block 18 with the integrated plug-in part 12 and the first guide pin (working ram) 42 in the direction of the socket part 14, the housing face 24 of the second housing 22 is pushed into the socket part 14.

In the commencing coupling procedure the control socket 44 is pushed further into the pressure relief device 70 than is the case in the home position.

The control cam 54 operates a valve element 51, as a result of which an aperture between a pressure-relief connection line 52 and the pressure relief chamber 46 is opened in the pressure relief valve 72. Because the pressure relief chamber 46 is connected to a non-pressurised pressure relief line 48, according to the principle of communicating vessels, pressure relief in the socket part 14 can take place by way of the elimination valve 49. In particular, the first medium channel 66 is thus relieved in the socket part 14 by way of the pressure-relief connection line 52.

In a second coupling step according to FIG. 4 the housing elements 62 and 64—see FIG. 2B—are further displaced in axial direction against the spring elements 58 and 60 in the direction of the channel 66.

The ram 28 is fundamentally displaced axially against the force of the first spring element 76 due to the counterforce that emanates from the stationary slide element 26, in the direction of the channel 68.

As a result of this arrangement a fourth sealing device 88 of the slide element 26 on the third housing element 64 is released. Further axial displacement takes place by way of the first guide pin (working ram) 42 onward in the direction of the control socket 44.

Pressure relief acts by way of the pressure-relief connection lines 52C, 52B, 52A (FIGS. 8 and 9) by way of the first medium channel 66 to chamber 34 by opening the sealing device 88 in the plug-in part 12. As a result of this first described displacement the control socket 44 leaves its limit stop 80 in the control socket borehole 78 of the first connection block (coupling block) 16.

FIG. 4 shows a sectional view of the quick coupling 100 in the partly coupled state P2 according to the first and the second coupling steps.

The diagram shows that the fourth sealing device 88 is slowly released by axial displacement of the housing elements 62 and 64, and comprises a connection to the chamber 34. The first spring element 76 of the plug-in part 12 is already in a partly tensioned state. The pressure-relief valve system 50 is open and pressure equalisation by way of the first medium channel 66 and the pressure-relief connection line 52C to 52A right up to the chamber 34 takes place.

In continuation of the converging movement of the connection blocks 16 and 18 (coupling device) the control socket 44 enters further into the pressure-relief valve system 50.

FIG. 5 shows that the cam 54 continues to engage the region of the pressure relief valve 72.

In a third coupling step according to FIG. 5 a pressure reduction element 56 makes possible a first pressure equalisation of the two coupling parts 12 or 14 beyond the chamber 34. Pressure relief, or a first pressure equalisation, then takes place between the second medium channel 68 and the chamber 34. To this effect the ram 28 with its side facing the first sealing device 30 touches a pressure pin integrated into the first sealing device 30, which pressure pin releases a pilot flow in existing gaps of the first sealing device 30.

However, during the generated pilot flow, which causes the first pressure equalisation between the chamber 34 and the second medium channel 68, the first sealing device 30 still rests against the seal seat 32.

In the further coupling process, a fourth coupling step, according to FIG. 6B the sealing device 30 is still further axially displaced in the direction of the channel 68 as a result of the action of the ram 28. The seal seat 32 is released, and by way of the released chamber 34, through the partly-open fourth sealing device 88, the channel 68 is also completely relieved of pressure by the pressure relief device 70 and its pressure relief valve 72.

FIG. 6B further shows that the first guide pin (working ram) 42 of the control socket 44 is further displaced into the pressure relief device 70. The end of the control cam 54 has been reached. The control cam 54 has run off the pressure relief valve 72. As the control cam 54 runs off the pressure relief valve 72 the pressure relief valve system 50 closes and consequently the pressure relief chamber 46 and thus the elimination valve 49 close.

In the last phase of the coupling process of the connection blocks 16 and 18 the plug-in part 12 is completely slid into the socket part 14. A second sealing device 36 provides sealing of a first phase 17 of the first connection block 16 and a second phase 19 of the second connection block 18. This second sealing device 36 seals off the entire perimeter of the second connection block when it engages the first connection block. The quick coupling 100 has thus reached its coupled terminal position, and closing the elimination valve ensures pressure build-up.

This pressure relief function according to FIGS. 3 to 6C can be realised by arranging several pressure-relief connection lines 52A, B, C (FIGS. 8 and 9) right up to the pressure relief device 70 for any desired number of coupling pairs 12 and 14.

FIGS. 6A to C show the quick coupling 100 in its fully opened coupled state. In this arrangement FIG. 6A again shows a perspective view of the quick coupling in the completely coupled state; FIG. 6B shows a section of the quick coupling in the fully coupled state; and FIG. 6C shows a section of a pressure relief device in the additional block of the quick coupling in the fully coupled state.

The first spring element 76 (FIG. 6B) is now in its completely tensioned state. The ram 28 pushes against the stationary slide element 26, as a result of which the first sealing device 30 lifts from the housing 22 of the plug-in part 12. The pressure reduction valve 56 is fully open. The ram 28 is fully displaced in the direction of the socket part 14. At the same time the fourth sealing device 88 is open so that it no longer rests against the third housing element 64 of the socket part 14. The housing faces 24 of the plug-in part 12 and of the socket part 14 are pushed against the spring elements 58 and 60 by their housing elements 62 so that the fourth sealing device 88 of the slide element 26 fully releases the connection between the chamber 34 and the channel 66. After completed coupling of the quick coupling 100, pressure relief is no longer necessary.

The first guide pin (working ram) 42 has guided the control socket 44 further into the pressure relief device 70 so that the control cam 54 no longer engages the pressure relief valve 72. The pressure relief valve 72 closes. The pressure relief function of the pressure relief device 70 is thus interrupted. In the quick coupling 100 the full medium pressure of the connected open coupling parts 12 and 14 builds up.

FIG. 6A shows a perspective outside view of the quick coupling 100 in its fully coupled state. The coupled lines L1 and L2 between the connection blocks 16 and 18 are shown, as is the additional block 84, which in this embodiment accommodates the pressure relief device 70.

As shown in FIG. 6C, the pressure relief device 70 leads by way of the pressure relief chamber 46, which is not visible from the outside, to the common pressure relief line 48. The pressure-relief valve systems 50, which are arranged radially in relation to the pressure relief chamber 46, which pressure-relief valve systems during the coupling procedure are opened and closed by way of the guide pin 42 and the control socket 44, are only indicated by their closure elements.

FIG. 6A is a perspective view of the quick coupling 100 as seen by the user. The cover 124 of the first connection block 16 is open, and the second connection block 18 is moved so that it is directly adjacent to the first connection block 16. This coupling with the prescribed pressure relief is mechanically supported by the lever element 92 that has been provided. As already described in the context of FIGS. 2A to 2C, the lever accommodation device 96 engages the accommodation element 98, which is located on the second connection block 18. The lever accommodation device 96 provides a type of control curve for the coupling procedure, because bringing together the connection blocks 16, 18 is predeterminable with the lever accommodation device 96. This control curve of the lever accommodation device 96 thus makes it possible to determine the point in time at which the cam 54 of the control socket 44 (FIG. 10) opens the pressure-relief valve system 50 of the pressure relief device 70 during closing or opening the quick coupling 100 for pressure relief. The other components of FIG. 6A are known from the description provided so far, in particular in the context of FIGS. 2A to 2C.

Opening the quick coupling 100 takes place the other way round.

Corresponding to the coupling steps described in the context of FIGS. 3 to 6C, when the quick coupling 100 is being closed, in reverse order, first the chamber 34, which faces the second medium channel 68, is closed by closing the first sealing device 30 (fourth coupling step) by means of pressure relief by way of the pressure relief device 70.

Subsequently the pressure reduction valve 56 (third coupling step) in the plug-in part 12 also closes.

The force of the spring element 76 results in a further return of the ram 28 to its home position. The housing elements 23, 62 and 64 are also displaced back to their home positions (non-coupled position P1) as a result of the force of the spring elements 58 and 60 so that the fourth sealing device 88 (second coupling step) of the slide element 26 again provides a seal on the third housing element 64.

As a result of this, in the socket part 14 the first medium channel 66 is closed off against the chamber 34 or the plunger 28 while at the same time providing pressure relief by way of the pressure relief device 70.

Finally, at the end of the uncoupling process the pressure relief device 70 and thus the elimination valve 49 close in that the control device 10 leaves the region of the pressure relief valve 72 of the pressure relief device 70 so that pressure equalisation is interrupted. Thus after separation of the connection blocks 16 and 18, each coupling part 12 and 14 is sealed off both against the pressure-relief connection lines 52 and against the face.

Figure 7:
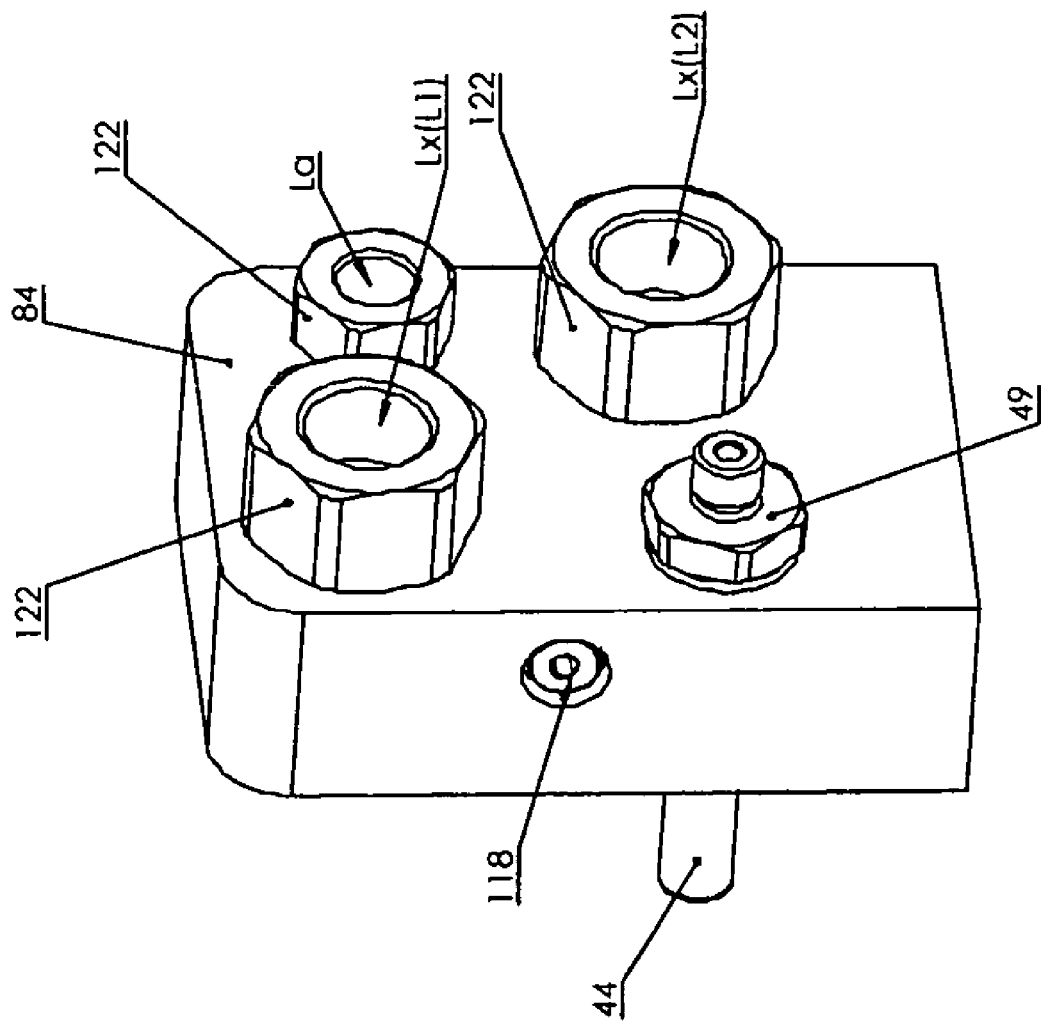
FIG. 7 a perspective view of the machine-side connection of the additional block.

FIGS. 7 to 9 show the additional block from the outside in a perspective view of the connection on the machine side and a section of the additional block showing the pressure-relief connection lines 52A to 52D as well as a section (FIG. 9) with several sectional planes of the quick coupling. FIG. 10 shows the connection options, on the machine side, of the additional block 84, wherein apart from the pressure lines L1, L2 an additional line (so-called outlet line) La is shown. So-called adapters 122 are associated with each line. In the lateral region of the additional block 84 a plug 118 is shown, which, as is also shown in the sectional view of FIG. 8, makes possible access to the pressure-relief connection lines 52 and in particular to a first nonreturn valve 114. On the opposite side of the additional block 84 at another height there is also a plug 118 which provides access to a second nonreturn valve 116. The respective nonreturn valves 114 and 116 make it possible to set the extent of pressure relief of the respective coupling pairs 12 and 14 (not visible in the drawing).

In FIG. 8 the section view shows the corresponding boreholes 120 in which the pressure-relief connection lines 52 end. Starting from the borehole 120, a first pressure-relief connection line 52A is associated with the first pressure line L1 and is connected to the pressure relief device 70 by way of the first nonreturn valve 114. Analogously to this the second pressure line L2 is connected to a third pressure relief line 52C by way of a fourth pressure relief line 52D, wherein in the third pressure relief line 52C again a second nonreturn valve 116 for setting the extent of pressure relief is arranged. The third pressure-relief connection line 52C again leads to the pressure relief device 70. By way of the second pressure-relief connection line 52B, the first pressure-relief connection line 52A and the third pressure-relief connection line 52C are interconnected so that each pressure line L1, L2 can be routed to the pressure relief line 70 by way of a system of pressure relief connection lines 52.

FIG. 9 shows the analogous arrangement of the pressure relief connection lines 52A to 52D and the arranged nonreturn valves 114, 116 in various sectional planes. In the boreholes 120, the respective first, second and third connection adapters 106, 108 and 110 are shown. In addition, the section view in FIG. 9 shows a socket borehole 112 which the second guide pin 43 of the quick coupling 100 engages during the coupling or decoupling procedure. The design illustrated in FIG. 9 in particular shows that a central pressure relief device 70, even without the presence of an additional block 84, can be arranged so as to be completely in the first connection block 16 of the socket part 14.

Finally, FIG. 9 diagrammatically shows the lever element 92, which is arranged on the outside, which lever element 92 ensures mechanical securing and joining of the quick coupling.

LIST OF REFERENCES

100 Quick coupling
10 Control device
12 Plug-in part
14 Socket part
16 First connection block
17 First face (first connection block 16)
18 Second connection block (coupling block)
19 Second face (second connection block 18)
20 Housing (socket part 14)
22 Second housing (plug-in part 12)
23 First housing element
24 Housing face
26 Slide element
28 Ram
30 First sealing device (plug-in part 12)
32 Seal seat
34 Chamber
36 Second sealing device (faces 17, 19)
38 Third sealing device (second housing 22)
40 Slide element bearing
42 First guide pin (working ram)
43 Second guide pin
44 Control socket
45 Control socket spring
46 Pressure relief chamber
47 Part
48 Pressure relief line
49 Elimination valve
50 Pressure-relief valve system
51 Valve element
52A First pressure-relief connection line
52B Second pressure-relief connection line
52C Third pressure-relief connection line
52D Fourth pressure-relief connection line
54 Control cam
56 Pressure reduction element
58 First spring element
60 Second spring element
62 Second housing element
64 Third housing element
66 First medium channel
68 Second medium channel
70 Pressure relief device
72 Pressure relief valve
74 Spring control device
76 First spring element
78 Control socket borehole (in connection block 16)
80 Limit stop
84 Additional block
86 Ram bearing
88 Fourth sealing device
92 Lever element
94 Lever arm
96 Lever accommodation device
98 Accommodation element
102 Lever attachment
104 Rotary axis of the lever
106 First connection adapter 108 Second connection adapter
110 Third connection adapter
112 Socket borehole (in connection block 16)
114 First nonreturn valve
116 Second nonreturn valve
118 Plug
120 Boreholes
122 Adapter (on the machine side)
124 Cover
Lx Pressure lines
L1 First pressure line
L2 Second pressure line
La Outlet line
P1 Non-coupled position
P2 Coupled position

The invention claimed is:

1. A quick coupling for connecting at least two pressurised lines to a first coupling part that is connectable to a second coupling part so as to be pressure-proof, characterised by an externally arranged central pressure relief device which is integrated in the first coupling part, or arranged on the first coupling part in an additional block, which central pressure relief device can be connected to the pressurised lines by way of pressure-relief connection lines, wherein the second coupling part is a plug-in part and the first coupling part is a socket part and in a coupled position a control device for the central pressure relief device is arranged in a first and second connection block, or in a first and second connection block and an additional block adjacent to the first connection block, and a control device, comprising a first guide pin, arranged in the second connection block, in the coupled position acts on a control socket which is arranged in the first connection block, through which control socket a pressure-relief valve system of the central pressure relief device is operable in the first connection block, or in the first connection block and the additional block.

2. The quick coupling according to claim 1, characterised in that the central pressure relief device comprises the pressure-relief valve system and an elimination valve with a pressure relief line.

3. The quick coupling according to claim 2, characterised in that the pressure-relief valve system comprises a pressure relief valve which comprises at least one valve element.

4. The quick coupling according to claim 1, characterised in that the control socket comprises a control cam and a control socket spring that is arranged in the control socket.

5. The quick coupling according to claim 1, characterised in that the first guide pin displaces the control socket from a non-coupled position to the coupled position, wherein the first guide pin and the control socket are arranged so as to be positioned on one axis.

6. The quick coupling according to claim 1, characterised in that by way of the pressure-relief connection lines the central pressure relief device is connectable by way of at least one nonreturn valve to each of the pressurised lines.

7. The quick coupling according to claim 4, characterised in that the plug-in part comprises a first sealing device between a second medium channel and a chamber, and comprises a third sealing device between a ram and a second housing.

8. The quick coupling according to claim 1, characterised in that the socket part comprises a fourth sealing device between a slide element and a first housing, which comprises a first and a second housing element.

9. The quick coupling according to claim 5, characterised in that in a coupling procedure of the first and second coupling parts from the non-coupled position to the coupled position, at the same time the first and second connection blocks, or the first and the second connection blocks with the arranged additional block are reversibly displaceable in relation to each other.

10. The quick coupling according to claim 7, characterised in that in a first coupling step the first guide pin and the control socket are axially displaced, as a result of which a first medium channel in the first coupling part is connected to an elimination valve, wherein by way of the control cam of the control socket the pressure-relief valve system is opened by operating a pressure relief valve, and the pressure-relief connection lines to a pressure relief chamber and to a connecting pressure relief line are released to generate pressure equalisation.

11. The quick coupling according to claim 10, characterised in that in a second coupling step the first guide pin of the control socket is further axially displaced and at the same time releases a fourth sealing device connecting a chamber to the first medium channel in the socket part right up to the elimination valve, wherein the control cam of the control socket keeps the pressure-relief valve system open and releases the pressure-relief connection lines to the pressure relief chamber and to the connecting relief line to generate pressure equalisation up to the chamber within the quick coupling.

12. The quick coupling according to claim 11, characterised in that in a third coupling step a pressure reduction element is openable by operating a pressure pin by means of a ram in the first sealing device, as a result of which a first pressure equalisation between the second medium channel of the chamber can be generated by way of the first medium channel right up to the elimination valve.

13. The quick coupling according to claim 12, characterised in that in a fourth coupling step by further axial displacement of the first guide pin, for complete pressure equalisation and at the same time complete release of the first sealing device, the chamber in the second coupling part to the second medium channel opens, as a result of which a first pressure equalisation between the second medium channel and the chamber can be generated by way of the first medium channel right up to the elimination valve and the control socket is completely inserted in the pressure-relief valve system, after which the control cam of the control socket is led past the pressure-relief valve system, and the pressure-relief connection lines to the pressure relief chamber and to the subsequent pressure relief line close while pressure builds up in the quick coupling.

14. The quick coupling according to claim 1, characterised in that in the coupled position the first connection block and the second connection block provide sealing by means of a second sealing device between a first face of the first connection block and a second face of the second connection block.

15. The quick coupling according to claim 1, wherein the first and second coupling parts are reversibly movable from a non-coupled position to the coupled position by a lever element, and are lockable into place.

16. The quick coupling according to claim 15, characterised in that the second coupling part comprises an accommodation element.

17. The quick coupling according to claim 16, characterised in that the first connection block comprises a lever attachment for the lever element with a lever arm.

18. The quick coupling according to claim 17, characterised in that in the non-coupled position the lever element with a lever accommodation device engages the accommodation element and by means of a swivelling movement towards the socket part on a rotary axis of the lever element guides the plug-in part into the socket part, and in the coupled position reversibly locks it into place.

19. The quick coupling according to claim 18, characterised in that a desired control curve for bringing together the plug-in part and the socket part can be placed in the lever accommodation device.

20. A quick coupling for connecting at least two pressurised lines to a first coupling part that is connectable to a second coupling part so as to be pressure-proof, characterised by an externally arranged central pressure relief device which is integrated in a second coupling part, or arranged on a second coupling part in an additional block, which central pressure relief device can be connected to the pressurised lines by way of pressure-relief connection lines, characterised in that as a control device, a first guide pin, arranged in the second coupling part, in the coupled position acts on a control socket which is arranged in the first coupling part, through which control socket a pressure-relief valve system of the central pressure relief device is operable in the second coupling part, or in the second coupling part and the additional block.

21. The quick coupling according to claim 20, characterised in that the second coupling part is a plug-in part and the first coupling part is a socket part and in a coupled position a control device for the central pressure relief device is arranged in a first and second connection block, or in a first and second connection block and an additional block adjacent to the first coupling part.

22. The quick coupling according to claim 20, characterised in that the central pressure relief device comprises the pressure-relief valve system and an elimination valve with a pressure relief line.

23. The quick coupling according to claim 22, characterised in that the pressure-relief valve system comprises a pressure relief valve which comprises at least one valve element.

24. The quick coupling according to claim 20, characterised in that the control socket comprises a control cam and a control socket spring that is arranged in the control socket.

25. The quick coupling according to claim 20, characterised in that the first guide pin displaces the control socket from a non-coupled position to the coupled position, wherein the first guide pin and the control socket are arranged so as to be positioned on one axis.

26. The quick coupling according to claim 20, characterised in that by way of the pressure-relief connection lines the central pressure relief device is connectable by way of at least one nonreturn valve to each of the pressurised lines.

27. The quick coupling according to claim 24, characterised in that the plug-in part comprises a first sealing device between a second medium channel and a chamber, and comprises a third sealing device between a ram and a second housing.

28. The quick coupling according to claim 20, characterised in that the first coupling part comprises a fourth sealing device between a slide element and a first housing, which comprises a first and a second housing element.

29. The quick coupling according to claim 20, characterised in that in a coupling procedure of the first and second coupling parts from the non-coupled position to the coupled position, the first and second coupling parts, or the first and the second coupling parts with the arranged additional block are reversibly displaceable in relation to each other.

30. The quick coupling according to claim 27, characterised in that in a first coupling step the first guide pin and the control socket are axially displaced, as a result of which a first medium channel in the first coupling part is connected to an elimination valve, wherein by way of the control cam of the control socket the pressure-relief valve system is opened by operating a pressure relief valve, and the pressure-relief connection lines to a pressure relief chamber and to a connecting pressure relief line are released to generate pressure equalisation.

31. The quick coupling according to claim 30, characterised in that in a second coupling step the first guide pin of the control socket is further axially displaced and at the same time releases a fourth sealing device connecting a chamber to the first medium channel in the first coupling part right up to the elimination valve, wherein the control cam of the control socket keeps the pressure-relief valve system open and releases the pressure-relief connection lines to the pressure relief chamber and to the connecting relief line to generate pressure equalisation up to the chamber within the quick coupling.

32. The quick coupling according to claim 31, characterised in that in a third coupling step a pressure reduction element is openable by operating a pressure pin by means of a ram in the first sealing device, as a result of which a first pressure equalisation between the second medium channel of the chamber can be generated by way of the first medium channel right up to the elimination valve.

33. The quick coupling according to claim 32, characterised in that in a fourth coupling step by further axial displacement of the first guide pin, for complete pressure equalisation and at the same time complete release of the first sealing device, the chamber in the second coupling part to the second medium channel opens, as a result of which a first pressure equalisation between the second medium channel and the chamber can be generated by way of the first medium channel right up to the elimination valve and the control socket is completely inserted in the pressure-relief valve system, after which the control cam of the control socket is led past the pressure-relief valve system, and the pressure-relief connection lines to the pressure relief chamber and to the subsequent pressure relief line close while pressure builds up in the quick coupling.

34. The quick coupling according to claim 21, characterised in that in the coupled position the first coupling part and the second coupling part provide sealing by means of a second sealing device between a first face of the first coupling part and a second face of the second coupling part.

35. The quick coupling according to claim 20, wherein the first and second coupling parts are reversibly movable from a non-coupled position to the coupled position by a lever element, and are lockable into place.

36. The quick coupling according to claim 35, characterised in that the second coupling part comprises an accommodation element.

37. The quick coupling according to claim 36, characterised in that the first connection block comprises a lever attachment for the lever element with a lever arm.

38. The quick coupling according to claim 37, characterised in that in the non-coupled position the lever element with a lever accommodation device engages the accommodation element and by means of a swivelling movement towards a socket part on a rotary axis of the lever element guides a plug-in part into a socket part, and in the coupled position reversibly locks it into place.

39. The quick coupling according to claim 38, characterised in that a desired control curve for bringing together the plug-in part and the socket part can be placed in the lever accommodation device.

* * * * *